Feb. 16, 1965 K. W. GALLIGER 3,169,488
ROTARY CYLINDER BARREL AND METHOD OF MAKING SAME
Filed Nov. 3, 1961 2 Sheets-Sheet 2
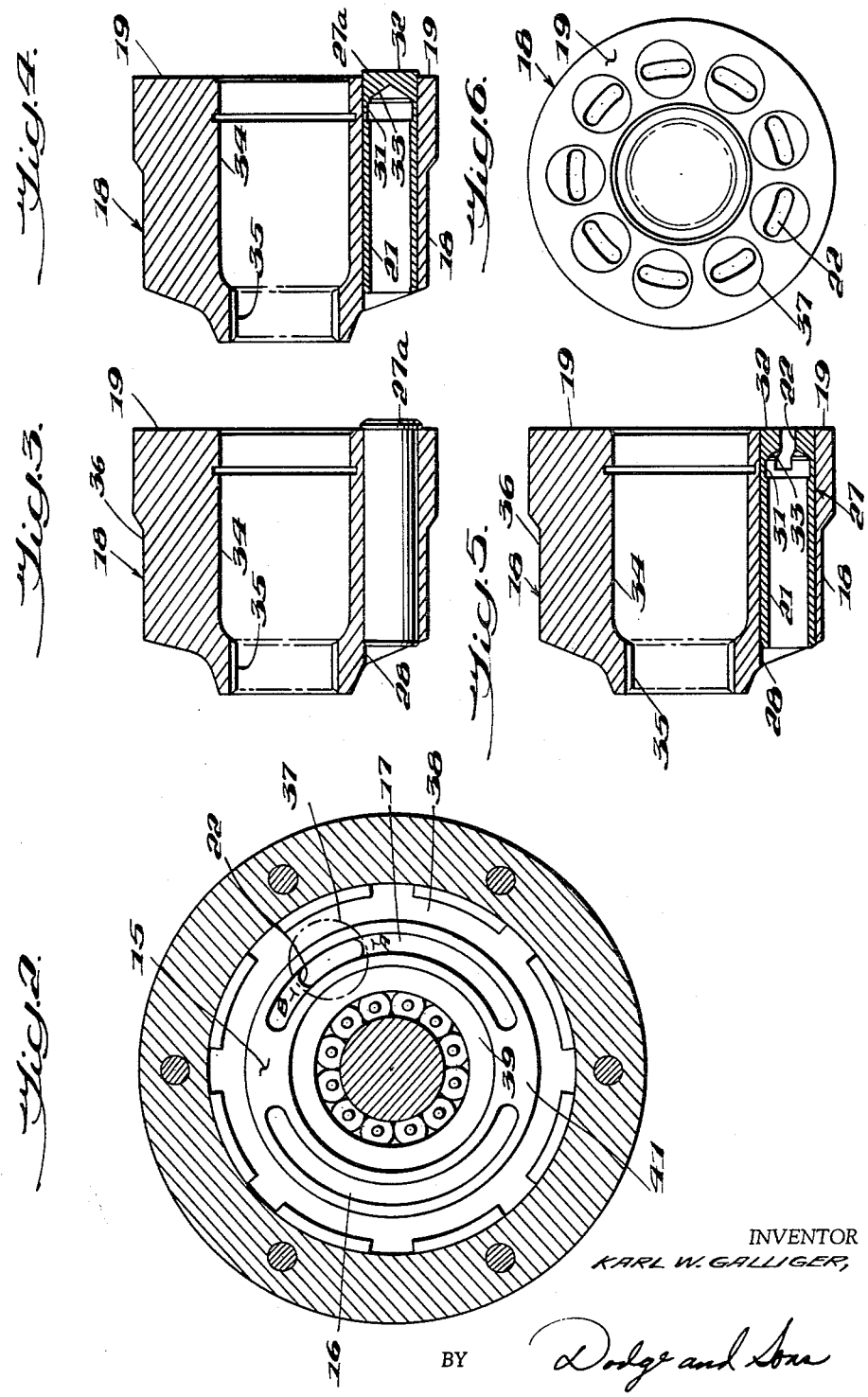
INVENTOR
KARL W. GALLIGER,
BY Dodge and Sons
ATTORNEYS

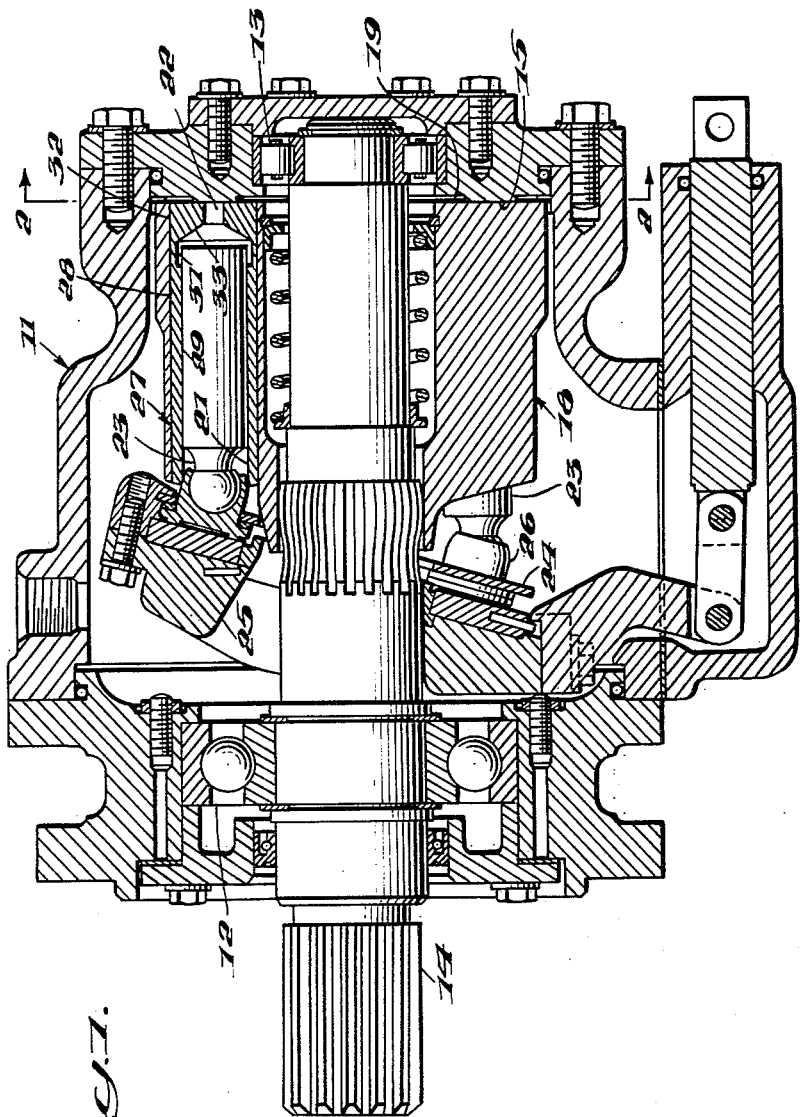

United States Patent Office 3,169,488
Patented Feb. 16, 1965

3,169,488
ROTARY CYLINDER BARREL AND METHOD
OF MAKING SAME
Karl W. Galliger, Watertown, N.Y., assignor to The New
York Air Brake Company, a corporation of New Jersey
Filed Nov. 3, 1961, Ser. No. 149,900
4 Claims. (Cl. 103—162)

This invention relates to rotary cylinder barrel longitudinally reciprocating piston pumps and motors. More particularly, the invention relates to pumps and motors of the type just mentioned in which the cylinders are provided with liners and to a novel method of manufacturing such a device.

In engines of this kind, one end of the cylinder barrel frequently carries a valving face that is in rotary engagement with a stationary valve face containing arcuate high and low pressure ports. The rotary valving face contains a circular series of small arcuate working chamber ports, one for each cylinder bore. The cross-sectional area of each working chamber port is less than the cross-sectional area of the cylinder bore so that a radial reaction surface is provided against which the pressure in the cylinder bore develops a force that urges the cylinder barrel into sealing engagement with the stationary valve face. The pistons project from the opposite ends of the cylinder bores and are in operative engagement with a cam plate that moves them on their discharge strokes. The force transmitted between the cam plate and each piston acts at an angle to the longitudinal axis of the piston with the result that the radial component of this force produces a bending moment on the piston. In high speed, high pressure pumps and motors in which both the piston and the cylinder barrel are made of steel, this condition frequently causes piston galling.

One proposed solution to the galling problem consists in employing cylinder liners that are formed of a bearing material, such as bronze, and extend into, but not through, the cylinder barrel from the end opposite the valving face. Since the inner end of the liner terminates, and thus is subject to the pressure, in the cylinder bore, the entire circumference of the interface between the outer periphery of the liner and the bore that receives it affords a potential leakage path along which fluid may escape. It is very difficult, if not impossible, at the present state of the art, to provide an effective fluid-tight seal at the interface, and, therefore, the use of cylinder liners as a solution to the galling problem has been limited.

The object of the present invention is to provide a cylinder liner and method of forming same that is not subject to the disadvantage mentioned above. According to this invention, the liner comprises a one piece unit formed of bearing material that includes a sleeve portion that surrounds the piston and defines the cylinder bore, and an end portion that is flush with the valving face and contains the reduced cross-section working chamber port. Since the liner extends through the cylinder barrel, only that portion of the interface between the outer periphery of the liner and the cylinder barrel that overlies the arcuate high pressure port in the stationary valve face is subject to high pressure. This portion is only a small part of the entire circumference of the interface, and, therefore, the potential leakage path is materially reduced.

In accordance with the preferred method, the liner is machined from a rod of bearing material that is inserted into a through bore formed in thet cylinder barrel and expanded radially, by the application of an axial force, into tight engagement with the bore. The rod is then bonded to the cylinder barrel to insure a permanent, but not necessarily fluid-tight, mechanical connection. The cylinder bore, i.e., the bore that actually receives the piston, and the working chamber port are then machined in the bar and the valving face is ground and finished. Since the final machining of the cylinder bore and working chamber port are done in the comparatively soft bearing material instead of the steel cylinder barrel, this method results in reduced manufacturing costs.

The preferred embodiment of the invention is described in detail with reference to the accompanying drawings in which:

FIG. 1 is an axial sectional view of a typical variable displacement pump incorporating the invention.

FIG. 2 is a sectional view taken on line 2—2 of FIG. 1.

FIGS. 3–5 are axial sectional views of the cylinder barrel showing various steps in the process of forming the cylinder bores.

FIG. 6 is a view of the valving face of the cylinder barrel shown in FIG. 5.

FIGS. 1 and 2 illustrate a typical rotary cylinder barrel pump in which the invention may be used. This pump includes a housing 11 containing bearings 12 and 13 that support the drive shaft 14, and provided with a stationary valve face 15 that lies in a plane that is normal to the axis of rotation. The valve face 15 contains diametrically opposed inlet and discharge ports 16 and 17 that communicate with the main inlet and discharge ports (not shown) of the pump. Splined to drive shaft 14 is a rotary cylinder barrel 18 whose right end face 19 is in engagement with the stationary valve face 15 and which is provided with a circular series of nine cylinder bores 21. Each of these bores 21 communicates sequentially with the arcuate ports 16 and 17 through a small arcuate working chamber port 22 as the cylinder barrel rotates. A reciprocable piston 23 is mounted in each cylinder bore and these pistons are moved on their inlet and discharge strokes by return plate 24 and cam plate 25 with which they are connected by shoes 26. The cam plate 25 is mounted on trunnions (not shown) for angular adjustment about an axis that is normal to and intersects the axis of rotation. As is well known, angular movement of the cam plate varies the length of the piston strokes and, therefore, varies the displacement of the pump.

The cylinder bores 21 are formed in one-piece liners 27 made of bearing material, such as bronze, and mechanically fixed in bores 28 extending through the cylinder barrel in directions parallel with the axis of rotation. Each liner has a straight sleeve portion 29 that defines the cylinder bore 21 and contains an annular piston runout groove 31, and an end portion 32 whose outer face is flush with the valving face 19 and which contains the arcuate working chamber port 22. At the junction of the working chamber port 22 and the cylinder bore 21 is an inclined annular shoulder 33 against which the pressure in the cylinder bore acts to urge the cylinder barrel into sealing engagement with the stationary valve face 15.

Referring to FIGS. 3–5, the liners 27 are machined in situ from solid rods 27a of bronze that are fixed in the through bores 28 in the steel cylinder barrel. After the axial bore 34, including splines 35, and the outer peripheral surface 36 have been finished and the barrel has been annealed, the bores 28 are drilled and the barrel and the rods 27a are degreased. The barrel is then heated to approximately 200° F. and the rods 27a are pressed into the bores 28 with their ends projecting from each end of the cylinder barrel as shown in FIG. 3. Next, an axial force is applied to each rod (as by a pneumatic hammer) to expand the rods radially into tight engagement with the walls of bores 28. Finally, the barrel is heated to approximately 1600° F. in a reducing atmosphere to produce a bond between the bronze and the steel, and then, it is heat treated in a conventional manner to harden the splines 35.

The cylinder bore 21 and run-out groove 31 are now machined in each plug 27a as shown in FIG. 4 and the bore is finish honed. The valving face 19 of the cylinder barrel is then ground to remove the projecting ends of rods 27a and the arcuate working chamber ports 22 are end milled in the end portions 32 of the rods. The final machining operation consists in lapping the valving face 19.

An inspection of FIG. 2, in which the phantom line indicates the interface 37 between one liner 27 and its bore 28, will show that the only portions of the interface that are subject to full discharge pressure (frequently on the order of 3000 p.s.i.) are those overlying the arcuate discharge port 17 and labeled A and B. The balance of the circumference of interface 37 overlies either the leakage grooves 38 and 39, that are subject to the low case pressure (typically on the order of 50 to 100 p.s.i.), or the land 41 that is subject to a pressure gradient varying between discharge pressure at the edge of port 17 and case pressure at the edges of grooves 38 and 39, and thus these portions present no potential leakage problem. Since the cumulative length of the portions A and B is but a small fraction of the total length of the interface 37, leakage along the interface is either eliminated altogether or at least reduced to a tolerable value. As a result, the mechanical connections between the liners 27 and the cylinder barrel need not be absolutely fluid-tight.

Methods other than the one described above may be employed for mechanically connecting the liner 27 to the cylinder barrel. For example, the rods 27a can be attached to the cylinder barrel by adhesives, such as epoxy resin adhesives, or by snap rings. It is also possible to use tapered rods 27a that are driven into the bores 28. Another alternate involves casting the rods 27a in place in bores 28.

As stated previously, the drawings and description relate only to the preferred embodiment of the invention. Since changes, some of which have been mentioned, can be made in this embodiment without departing from the inventive concept, the following claims should provide the sole measure of the scope of the invention.

What I claim is:

1. The method of forming a cylinder bore in a rotary cylinder barrel for a reciprocating piston pump or motor wherein the cylinder barrel has a valving face at one end and an opposite end face from which the piston projects, comprising the steps of:
   (a) forming a hole through the cylinder barrel from end to end;
   (b) securing in the hole a body of bearing material having an end that projects from said valving face;
   (c) forming a cylinder bore in the body of bearing material;
   (d) forming a working chamber port in the end of the body projecting from the valving face that communicates with the cylinder bore; and
   (e) machining the projecting end of the body flush with the valving face.

2. The method of forming a cylinder bore in a rotary cylinder barrel for a reciprocating piston pump or motor wherein the cylinder barrel has a valving face at one end and an opposite end face from which the piston projects, comprising the steps of:
   (a) forming a hole through the cylinder barrel from end to end;
   (b) placing a rod of bearing material in the hole so that one end projects from the valving face;
   (c) applying a longitudinal force to the rod to expand it radially;
   (d) forming a cylinder bore in the rod;
   (e) forming a working chamber port in the end of the rod projecting from the valving face that communicates with the cylinder bore; and
   (f) machining the projecting end of the rod flush with the valving face.

3. The method defined in claim 2 in which the cylinder barrel is heated in a reducing atmosphere after the rod has been radially expanded to bond the rod to the cylinder barrel.

4. In a rotary cylinder barrel for a reciprocating piston pump or motor having a valving face at one end that cooperates with a stationary valve face, and an opposite end face from which the pistons project, the improvement that comprises:
   (a) a bore extending through the cylinder barrel from end to end; and
   (b) a one-piece insert fixed against movement in said bore and made of bearing material, said insert having
      (1) a sleeve portion adapted to receive the piston, and
      (2) an end portion whose face is flush with the valving face of the cylinder barrel and which contains a working chamber port that communicates with the interior of the sleeve portion.

References Cited in the file of this patent

UNITED STATES PATENTS

| | | |
|---|---|---|
| 1,582,076 | Page | Apr. 27, 1926 |
| 1,670,564 | Breer | May 22, 1928 |
| 2,106,236 | Burke | Jan. 25, 1938 |
| 2,176,773 | Sparkes | Oct. 17, 1939 |
| 2,206,305 | Rose et al. | July 2, 1940 |
| 2,279,671 | Ford | Apr. 14, 1942 |
| 2,289,405 | Beal | July 14, 1942 |
| 2,743,674 | Shaw | May 1, 1956 |
| 2,779,295 | Manning | Jan. 29, 1957 |

FOREIGN PATENTS

| | | |
|---|---|---|
| 144,756 | Great Britain | June 18, 1920 |
| 355,646 | Great Britain | Aug. 18, 1931 |
| 604,168 | Great Britain | Aug. 17, 1945 |
| 855,582 | Great Britain | Dec. 7, 1960 |